(12) United States Patent
Guntermann et al.

(10) Patent No.: US 11,713,754 B2
(45) Date of Patent: Aug. 1, 2023

(54) DEVICE FOR DRIVING A COMPRESSOR AND METHOD FOR ASSEMBLING THE DEVICE

(71) Applicant: Hanon Systems, Daejeon (KR)

(72) Inventors: Bernd Guntermann, Lennestadt (DE); David Walisko, Hürth (DE); Stephan Heinrichs, Hürtgenwald (DE)

(73) Assignee: HANON SYSTEMS, Daejeon (KR)

( * ) Notice: Subject to any disclaimer, the term of this patent is extended or adjusted under 35 U.S.C. 154(b) by 231 days.

(21) Appl. No.: 16/508,433

(22) Filed: Jul. 11, 2019

(65) Prior Publication Data

US 2020/0018300 A1  Jan. 16, 2020

(30) Foreign Application Priority Data

Jul. 11, 2018 (DE) .......................... 102018116764.4
Mar. 25, 2019 (DE) .......................... 102019107526.2

(51) Int. Cl.
*H02K 3/34* (2006.01)
*F04B 35/04* (2006.01)

(52) U.S. Cl.
CPC ............. *F04B 35/04* (2013.01); *H02K 3/345* (2013.01); *F04C 2240/40* (2013.01)

(58) Field of Classification Search
CPC ........... H02K 3/30; H02K 3/32; H02K 3/325; H02K 3/34; H02K 3/345; H02K 3/38
USPC .......................................................... 310/43
See application file for complete search history.

(56) References Cited

U.S. PATENT DOCUMENTS

| 5,763,978 A * | 6/1998 | Uchida | H02K 3/325 310/214 |
| 2013/0154427 A1* | 6/2013 | Asaga | H02K 3/50 310/180 |
| 2016/0190886 A1* | 6/2016 | Okamoto | H02K 11/0094 310/71 |
| 2016/0294240 A1* | 10/2016 | Kawamoto | H02K 3/522 |
| 2017/0005538 A1* | 1/2017 | Lee | H02K 1/14 |

(Continued)

FOREIGN PATENT DOCUMENTS

| CN | 202309298 U | 7/2012 | |
| EP | 3477823 A1 * | 5/2019 | ............... H02K 3/46 |
| GB | 2288918 A * | 11/1995 | ............... H02K 3/34 |

(Continued)

OTHER PUBLICATIONS

Naito, Machine Translation of WO2019187992, Oct. 2019 (Year: 2019).*

(Continued)

*Primary Examiner* — Eric Johnson
(74) *Attorney, Agent, or Firm* — Shumaker, Loop & Kendrick, LLP; James D. Miller

(57) ABSTRACT

The invention relates to a device for driving a compressor of a vaporous fluid, particularly an electric motor. The device has a rotor and a stator, which are extended along a common longitudinal axis, as well as an insulation element. The insulation element is designed as a single part and connected with a stator core of the stator in a form-fitting manner such that the stator core and the insulation element form an integral and single-part component of the stator. The invention further relates to a method for producing a stator of the device, particularly the stator core with the insulation element.

24 Claims, 6 Drawing Sheets

(56) References Cited

U.S. PATENT DOCUMENTS

Figure 1:
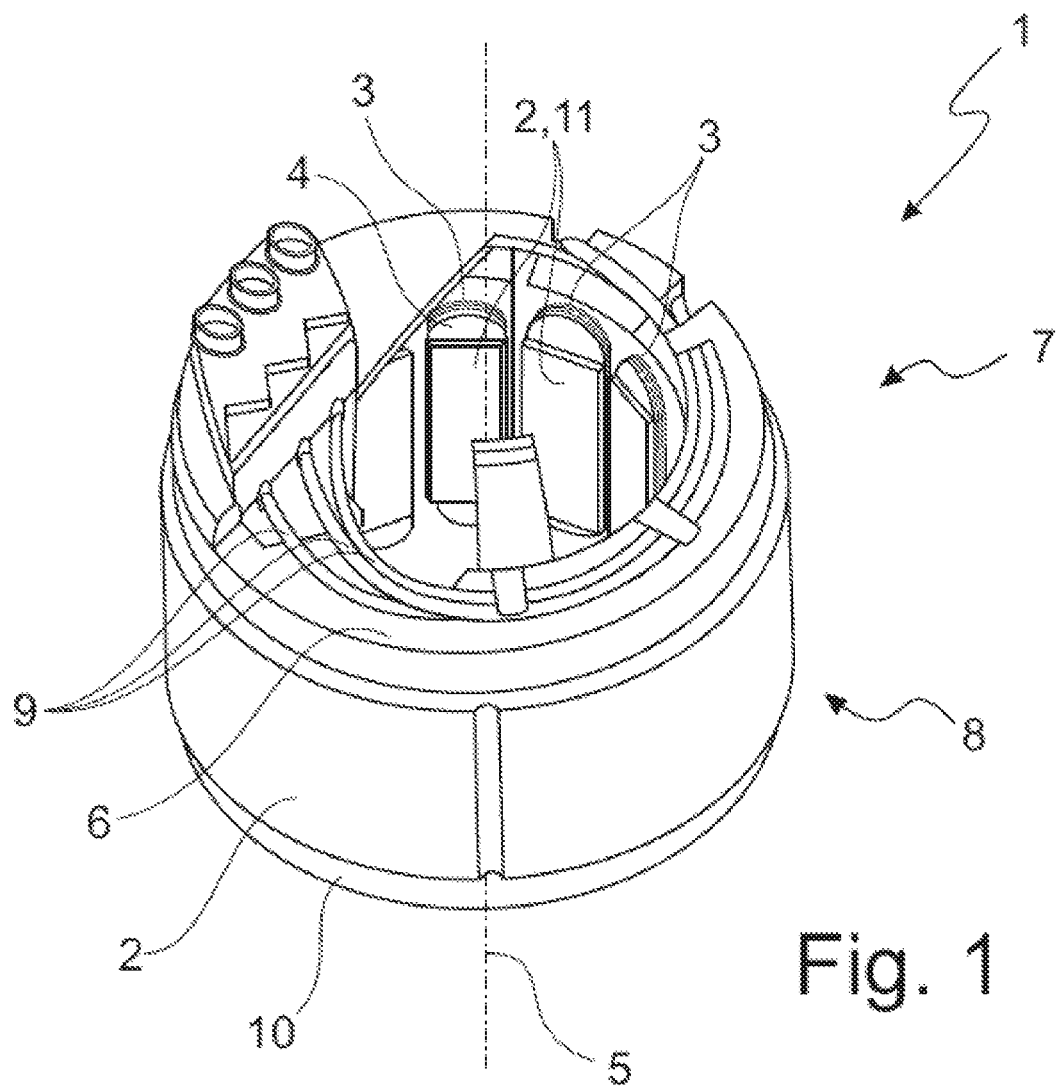

2017/0201135 A1* 7/2017 Kai ................. H02K 1/148
2018/0367008 A1* 12/2018 Hwang ............. H01R 13/115

FOREIGN PATENT DOCUMENTS

| | | | | |
|---|---|---|---|---|
| JP | S61149945 U | 9/1986 | | |
| JP | 2014007800 A | 1/2014 | | |
| JP | 2014072962 A | * 4/2014 | ............. | H02K 1/12 |
| JP | 2014072962 A | 4/2014 | | |
| JP | 2015220806 A | * 12/2015 | | |
| JP | 2015220806 A | 12/2015 | | |
| JP | 2017017981 A | 1/2017 | | |
| JP | 2018042400 A | 3/2018 | | |
| WO | 2015146677 A1 | 10/2015 | | |
| WO | WO-2019187992 A1 | * 10/2019 | ............. | A01D 34/78 |

OTHER PUBLICATIONS

Nakamura etal., Machine Translation of JP2014007800, Jan. 2014 (Year: 2014).*

* cited by examiner

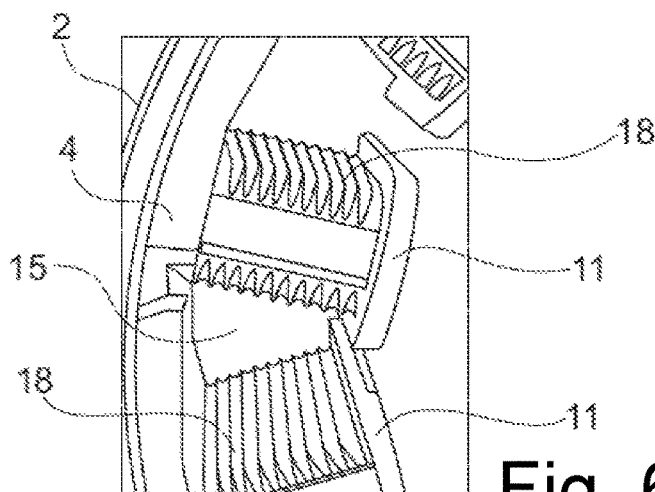
Fig. 6A
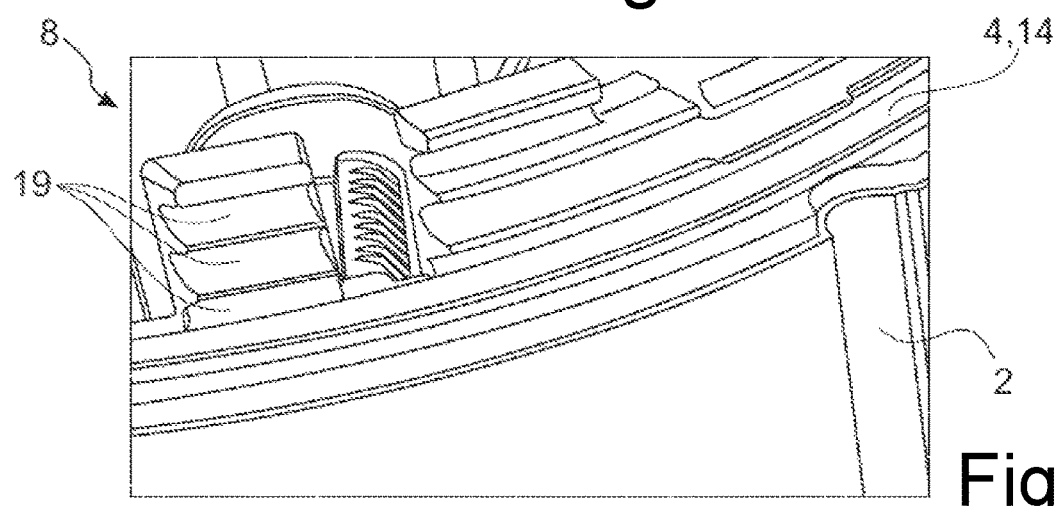
Fig. 6B
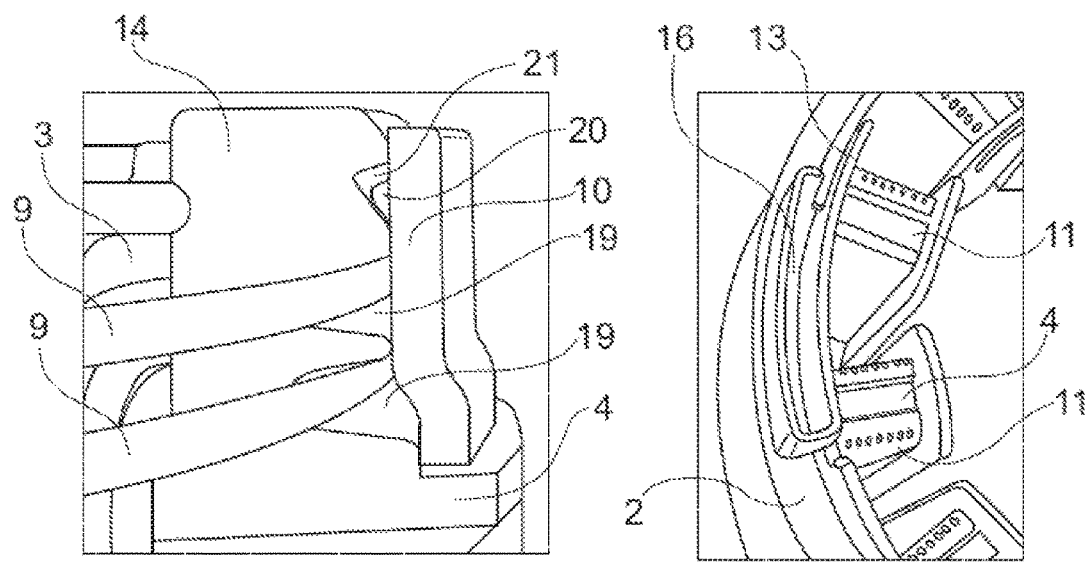
Fig. 6C                    Fig. 6D

DEVICE FOR DRIVING A COMPRESSOR AND METHOD FOR ASSEMBLING THE DEVICE

CROSS-REFERENCE TO RELATED PATENT APPLICATIONS

This patent application claims the benefit of German Patent Application No. DE 10 2019 107 526.2 filed Mar. 25, 2019 and German Patent Application No. DE 10 2018 116 764.4 filed Jul. 11, 2018, the entire disclosures of which are hereby incorporated herein by reference.

FIELD

The invention relates to a device for driving a compressor, particularly an electric motor, for compressing a vaporous fluid, especially a coolant. The compressor can be used in the coolant circuit of a climate-control system of a motor vehicle. The device has a rotor and a stator, which are arranged extending along a common longitudinal axis.

The invention further relates to a method for producing a stator of the device, particularly the stator core with the insulation element.

BACKGROUND

Compressors known from the prior art for mobile applications, particularly for climate-control systems of motor vehicles, to convey coolant through a coolant circuit, also characterized as coolant compressors, are often formed as a piston compressor with a variable piston displacement or as a scroll compressor, independently of the coolant. The compressors in this case are either driven by means of a belt pulley or electrically.

An electrically driven compressor has an inverter for driving the electric motor in addition to the electric motor for driving the respective compression mechanism. The inverter is used to convert direct-current of a vehicle battery into alternating current, which is supplied to the electric motor by means of electrical connections.

Conventional electric motors of the electrically driven compressor are formed with an annular stator core with coils arranged thereon and a rotor, wherein the rotor is arranged within the stator core. The rotor and stator are aligned on a common axis of symmetry or the axis of rotation of the rotor.

The force causing the torque in an electric motor is caused by a magnetic field, which is generated by inductivities formed as coils. The coils are formed from wound conducting wires on bars of a stator core, particularly a stator laminated core.

The inverter has plug connections for connectors formed as separate components and pins for electrically connecting with connections of the electric motor, which, in turn, are electrically connected to connection lines of the conducting wires of the coils of the stator. The connection lines are routed on front sides of the stator core.

In order to simultaneously ensure an electrical connection with high insulation resistance, for example between the wound conducting wires of the coils and the connection lines of the conducting wires, the connection lines and/or the conducting wires, also characterized as phase conductors, must be electrically insulated from one another and from other electrically conducting components of the stator as well as of the motor housing. The connection lines of the individual phases of the electric motor are preferably plastic-insulated as sections of the conducting wires, particularly formed from coated copper wire, of the coils.

The coating material of the conducting wires wound into the coils is electrically conductive. According to technical standards, the coated copper wire may have a maximum number of flaws, particularly defects or porosities, particularly pinholes, based on the production process and that significantly reduce the insulation resistance. In addition, the coated copper wire must have a defined minimum distance to other components, even inactive electrically conducting components, depending on voltage.

Consequently, it is known from the prior art to provide insulation between the conducting wires wound into coils and the electrically conductive stator core. In addition, the wound conducting wires are to be routed, depending on the winding plan, as connecting lines between the coils of a phase and the ends of the conducting wires in a predefined manner.

WO 2015 146677 A1 discloses an electrically driven compressor with a compression assembly, an electric motor for driving the compression assembly, and an inverter for supplying the electric motor with voltage. The electric motor has a rotor and a stator with electrically insulating bobbins arranged on the ends of a stator core formed in the axial direction, coils arranged on the bobbins, and a connector housing with connections for electrically connecting the coils with the inverter. The coils are formed from conducting wires wound about an area of the stator core extending inward in the radial direction as well as the bobbins arranged at the ends of the stator core.

In doing so, the most varied of components are used for the stator insulation. Individual insulators are provided between the areas of the stator core formed as bars and extending inward uniformly over the circumference of an outer wall in the radial direction and the coils. An insulator is also formed between all adjacently arranged coils or conducting wires wound into coils.

The stator known from the prior art consequently has a two-part insulator, particularly a plastic insulator, with a component on one of the outer sides of the stator core as well as additional insulators, particularly in the form of insulating paper or foil, which are arranged between adjacently arranged coils or between the conducting wires and the stator core.

In order to produce the stator formed in this manner, separate production steps are required for the injection-molding process of the bobbins, the production and mounting of the coils, as well as the mounting of the insulation elements.

With the isolator composed of multiple individual elements, which is additionally formed from different materials, there is an increased risk, particularly at the transition points of the individual elements, of insulation flaws and thus a reduction in the insulation resistance as well as the occurrence of short circuits. In addition, there is the risk that the fluid to be compressed, such as coolant, will flow between the individual elements themselves or the individual elements and other components of the stator in the area of the transition points of the individual elements of the insulation, which can also lead to shifting of the individual elements.

Furthermore, it is necessary to provide guidance and attachment of the conducting wires between the coils or at the connection points, which are conventionally ensured, for example, by means of a wax strip and fixing elements.

The formation of the multipart insulation additionally requires a very high number of components and is thus associated high cost for the material, the logistics, and the production.

SUMMARY

The object of the invention is the provision and improvement of a device for driving an electrically driven compressor of a vaporous fluid, particularly of an electric motor. In doing so, the conducting wires of the coils or the connecting lines and the connection lines of the conducting wires should be electrically isolated and capable of being routed in a fixed manner with respect to one another and especially with respect to the stator core. It should be possible to mount the device in a simple manner and thus time-saving manner, and the device should have the least possible number of individual components and be easy to implement from a design perspective in order to minimize, for example, the weight and the space requirements as well as costs during production.

The object is achieved by the subject matters with the features of the independent claims. Further embodiments are indicated in the dependent claims.

The object is achieved by means of a device according to the invention for driving a compressor of a vaporous fluid, particularly an electric motor. The device has a rotor and an unmoving stator, which are extended along a common longitudinal axis, as well as an insulation element. The stator is advantageously positioned in the radial direction on an outer side of the rotor, enclosing the rotor.

According to the concept of the invention, the insulation element is designed as a single part and connected with a stator core of the stator in a form-fitting manner such that the stator core and the insulation element form an integral and single-part component of the stator. The insulation element is durably connected to the stator core. A fixed connection of the insulation element with the stator core is considered to be a connection, which enables a separation of the components only by destroying at least one of the components. The insulation element is consequently formed as a structure that is inseparably connected to the stator core. The stator core formed on the outer side of the rotor and thus arranged about the rotor as well as preferably as a laminated core is thus at least partially insulated.

According to a further embodiment of the invention, the stator core and the insulation element are arranged extending along the longitudinal axis from a first front side to a second front side of the stator.

An axial direction in the following is understood to be the direction of the longitudinal axis of the stator, which also corresponds to the longitudinal axis and the axis of rotation of the rotor. A front side aligned in the axial direction is arranged in a plane aligned vertically to the longitudinal axis.

The insulation element is advantageously formed as a mold of the stator core fitting closely with an inner surface of an outer wall of the stator core.

The insulation element in this case fits closely on the inside of the outer wall of the stator core in a radial direction inward.

The outer wall of the stator core preferably has the shape of a hollow circular cylinder, which is provided with molding on an inner side. In the following, the inner side relates to the hollow-circular-cylindrical shape of the outer wall, while the inner surface also comprises the surface of the molding of the stator core, in addition to the surface of the inner side.

According to an advantageous embodiment of the invention, the insulation element is formed so as to protrude over the stator core, at least on one front side of the stator. In doing so, an area of the insulation element, said area protruding from the stator core in an axial direction on the front side of the stator has a substantially cylinder-shaped wall with molding. The wall of the insulation element is preferably formed in the shape of a hollow cylinder, particularly in the form of a hollow circular cylinder.

A first area of the insulation element, said area protruding from the stator core in this case is preferably designed such that at least 60% of a front surface of the stator core is covered in the area of the front side of the stator. The first area of the insulation element, said area protruding from the stator core additionally preferably has a mounting area in the form of a chamber for mounting connections of conducting wires as well as casting compound to hermetically seal the connection point of the conducting wires.

A second area of the insulation element, said area protruding from the stator core in the area of a second front side of the stator is advantageously formed with an outer diameter which is greater than an inner diameter of the outer wall of the stator core. In doing so, an outer radius of the stator core in the area of the second front side of the stator is preferably no more than 1 mm greater than an outer radius of the second area of the insulation element, said area protruding from the stator core, of the insulation element.

According to a preferred embodiment of the invention, the stator core is formed with bars for mounting conducting wires wound into coils. The bars are advantageously aligned distributed evenly about the circumference of the inner side of the outer wall of the stator core. The insulation element here is arranged between the conducting wires wound into coils and the stator core with the bars.

The conducting wires are preferably formed from coated and wound copper wire in the area of the coils, wherein non-wound ends of the conducting wires are routed from the respective winding as connection lines or connecting lines. The connection lines are preferably sheathed with a plastic as insulation.

A further advantage of the invention exists in that the insulation element is extended in the axial direction, on ends of the bars aligned inward in the radial direction and outward in the axial direction, particularly for guiding and retaining the conducting wires wound into coils. In doing so, the bars of the stator core preferably protrude from the insulation element with a front side aligned inward in the radial direction. The front sides of the bars of the stator core are consequently not covered by the insulation element.

According to a further embodiment of the invention, an intermediate space is formed between every two bars arranged next to one another with the insulation element molded around the bars. Because the bars with the insulation element molded around the bars advantageously have identical shapes and are arranged distributed evenly about the circumference of the inner side of the outer wall of the stator core, the intermediate spaces of the insulation element are also identically shaped.

In this process, every intermediate space is preferably delimited somewhat extensively by a base surface, two side surfaces, and two inner sides as well as formed as open in the axial direction and in the radial direction of the stator.

The base surface of every intermediate space can be completely covered by the insulation element. Furthermore, the side surfaces of each intermediate space can be covered completely by the insulation element. The surfaces of the inner sides of each intermediate space are preferably covered at least 50% by the insulation element.

According to a further advantageous embodiment of the invention, the insulation element has at least one first guiding contour for mounting conducting wires. In this case, the first guiding contour is formed at least on surfaces, of each bar, aligned in the axial direction. The first guiding contours consequently formed on an outer side of the insulation element form-fitting with a side surface as an elongated side of a bar particularly are used for mounting and guiding inner layers of the coils. In addition, the first guiding contours may also extend, at least partially, to the narrow sides formed between the elongated sides.

According to a further preferred embodiment of the invention, the insulation element has at least one second guiding contour for mounting conducting wires, particularly for mounting connecting lines as sections of the conducting wires. In doing so, the second guiding contour is formed on at least one outer side of the wall, which protrudes over the stator core on a front side of the stator in the axial direction, of an area protruding from the stator core. The at least one second guiding contour advantageously arranged circumferentially in the circumferential direction, in a plane vertically aligned with respect to the longitudinal axis of the stator, is formed as a recess for mounting and integrating particularly connecting lines as a magnetically inactive section of the conducting wires, which are used to connect coils of the same phase specifically with connecting elements.

The first guiding contours as well as the second guiding contours are preferably formed as recesses arranged parallel to one another, such as notches or grooves. In doing so, for example two grooves of a second guiding contour are arranged in a plane aligned vertically with respect to the longitudinal axis of the stator and some distance away from one another. In addition, a magnetically inactive section of a conducting wire can be completely integrated within a recess of a second guiding contour. The complete integration is understood to be the arrangement of the sections of the conducting wire in the recess, in which the conducting wire has its complete diameter embedded within the recess. The conducting wire does not protrude from the recess at any point. The maximum diameter of the conducting wire is less than the depth of the groove or corresponds to the depth of the groove.

According to a further embodiment of the invention, the insulation element is formed at least on a front side of the stator aligned in the axial direction for connecting with a cover element, which preferably has the shape of an axially aligned hollow circular cylinder.

The cover element advantageously lies completely on an outer side of a particularly cylinder-shaped wall of the second area of the insulation element, said area protruding from the stator core. In doing so, a diameter of the inner surface of the cover element corresponds to the diameter, especially the outer diameter, of the wall of the insulation element.

The cover element is preferably arranged, with the inner surface, sealed with every second guiding contour formed in the wall of the insulation element.

The cover element particularly formed from an electrically insulating material can advantageously be connected with the insulation element in a form-fitting manner.

Preferably, at least one latching element, which may have the shape of a rib as an overhang, is provided on the inner surface of the cover element. The latching element is preferably aligned and completely formed in a plane aligned vertically with respect to the longitudinal axis of the stator.

According to a further advantageous embodiment of the invention, the latching element protruding from the inner surface of the cover element and at least one second guiding contour or a latching recess formed on the outer side of the wall of the insulation element are formed to correspond with one another such that the latching element is arranged so as to latch within the second guiding contour or the latching recess.

Furthermore, a support element with at least one mounting element for at least one connector housing may be arranged on a front side, which is aligned with the cover element in the axial direction distal to the front side, of the stator.

The object is also achieved by means of a method according to the invention for producing the device for driving a compressor of a vaporous fluid, particularly an electric motor. In doing so, the insulating material is applied, in an injection-molding process, to intermediate spaces and contact surfaces for the inner surfaces of an outer wall of the stator core, which extend from a first front side to a second front side in the axial direction, formed for the injection-molding process.

According to a further embodiment of the invention, the insulation element is formed so as to protrude over the stator core, at least on one front side of the stator.

The advantageous embodiment of the invention enables the use of the device for driving a compressor, especially an electric motor, for compressing a vaporous fluid for a compressor of a coolant in a coolant circuit of a climate-control system of a motor vehicle.

The device according to the invention for driving a compressor of a vaporous fluid with a minimum number of necessary components and the method for producing the device have further various advantages:

- the single-part insulation element forms, as a mold structure with the stator core formed particularly as a laminated core, an integral component with an electrical isolator, which ensures corresponding creepage distances between the conducting wires and the stator core, depending on the voltage situation;
- the mold structure is implemented very easily during the injection-molding process and may comprise functions to guide and affix conducting wires and their connecting points such that additional components are no longer necessary and the conducting wires can be reliably and clearly arranged which, in turn, minimizes the placement of flaws during the winding process and shifting of the conducting wires.
- prevention of the occurrence of short-circuit currents between the conducting wires as well as other electrically conductive, inactive components by ensuring the necessary insulation distances depending on the voltage situation and thus increasing the insulation resistance;
- reduction in the scrap during production as a result of insufficient insulation resistance and thus generation of minimal costs; as well as
- maximization of the service life of the compressor.

DRAWINGS

Figure 2A:
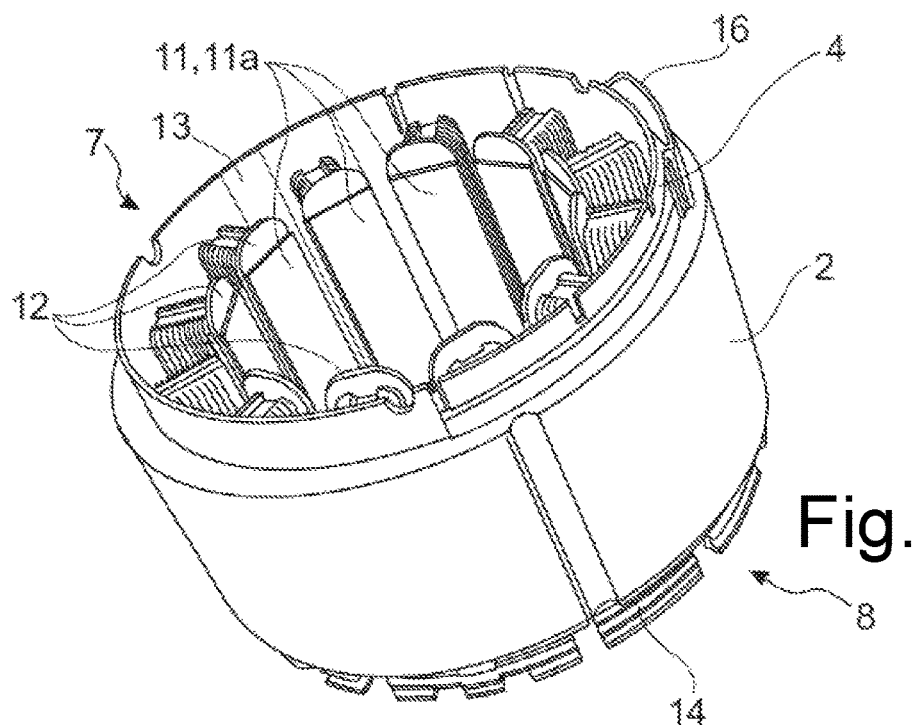
Figure 2B:
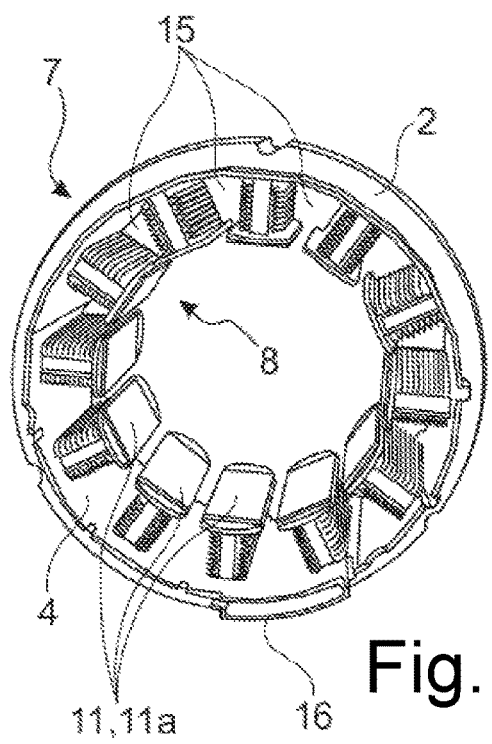
Figure 2C:
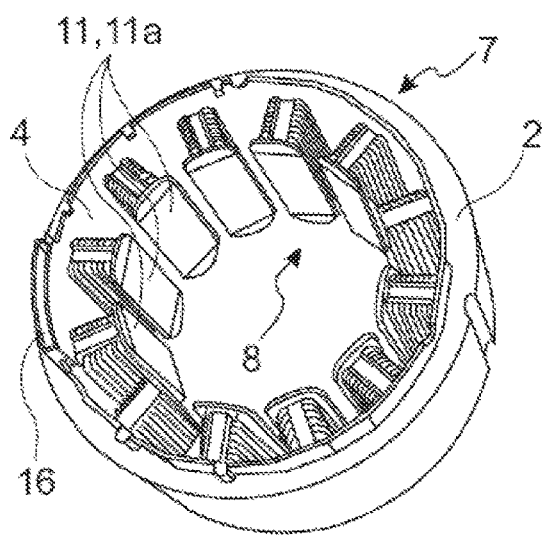
Figure 2D:
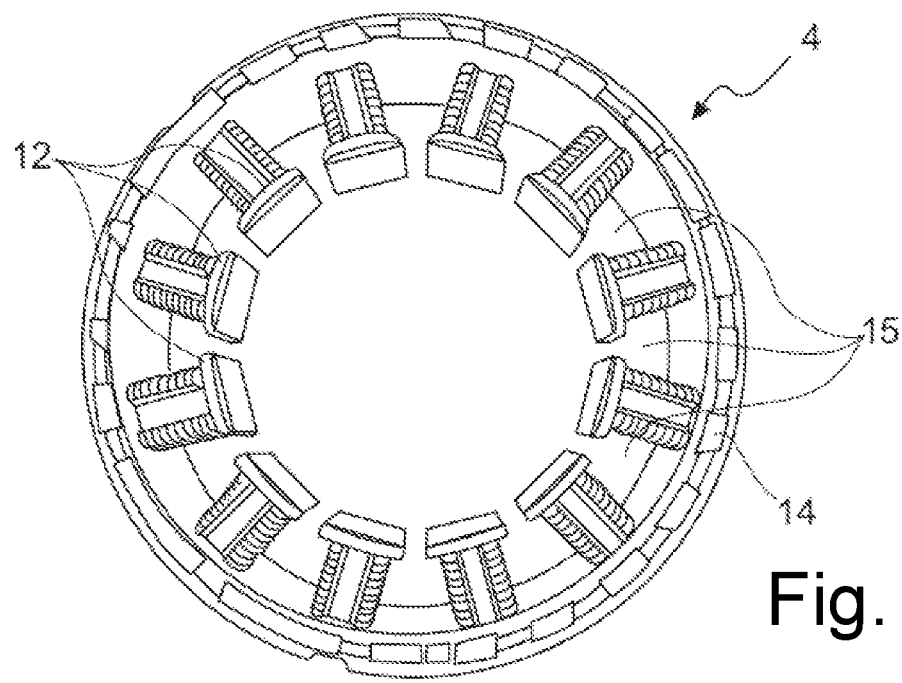
Figure 3:
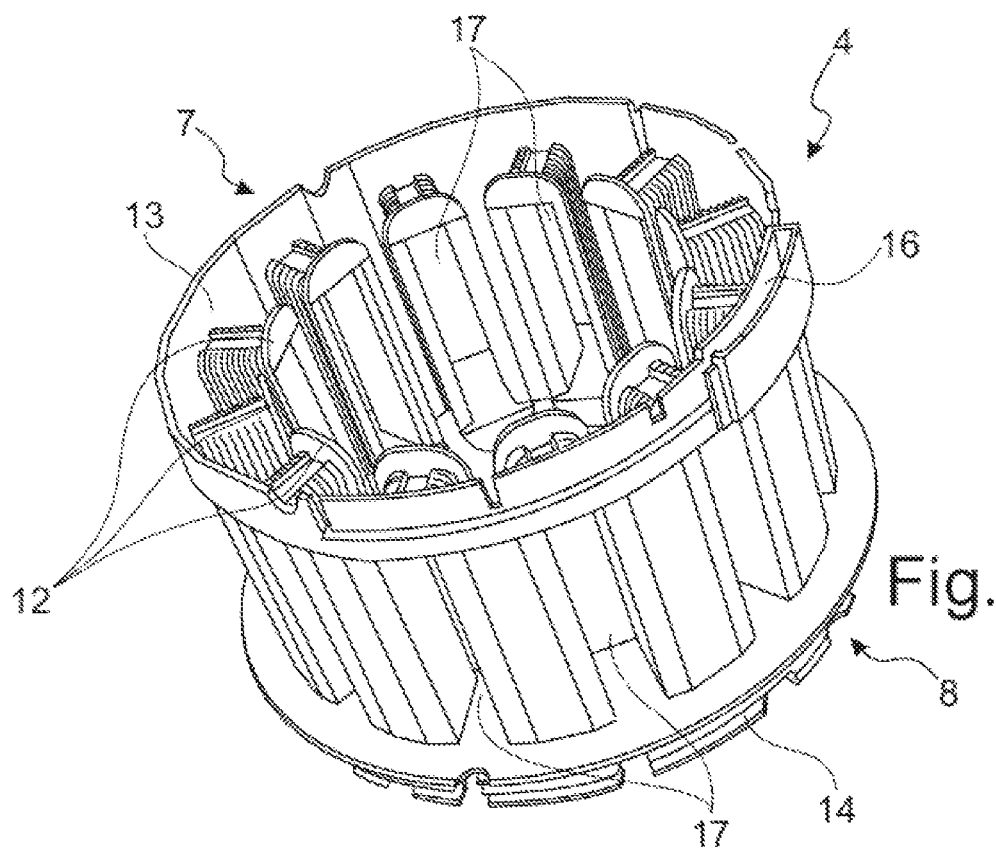
Figure 4A:
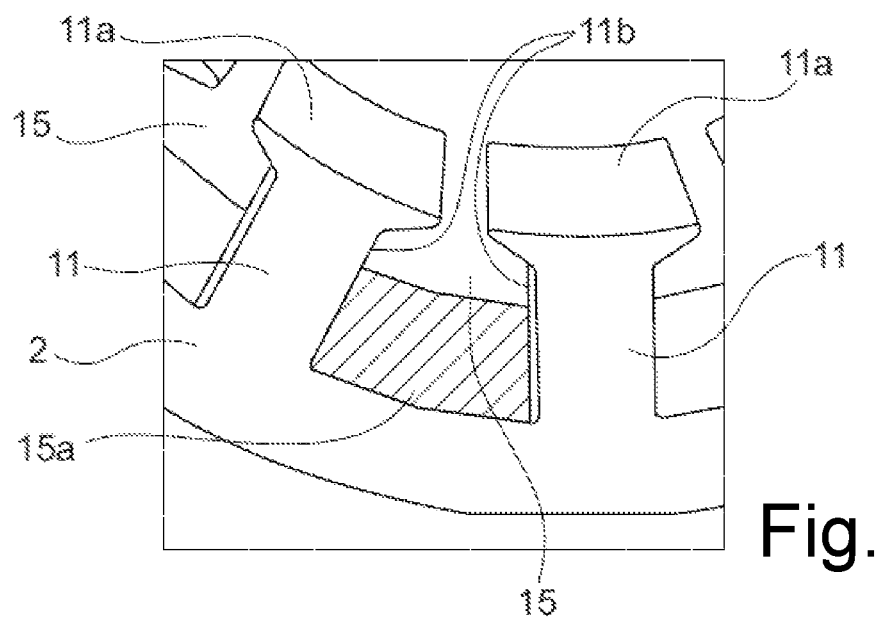
Figure 4B:
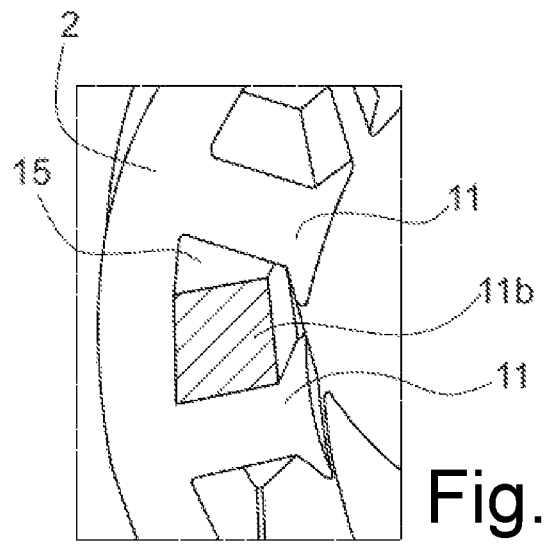
Figure 4C:
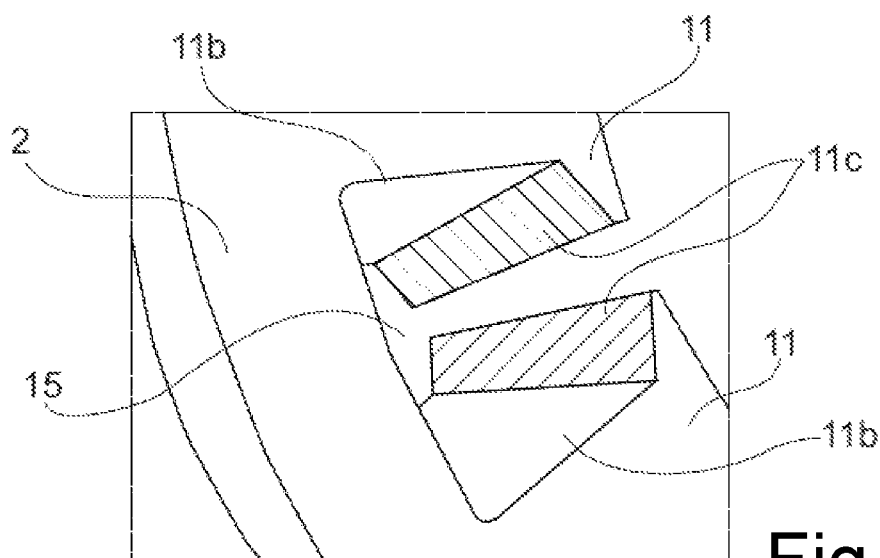
Figure 5A:
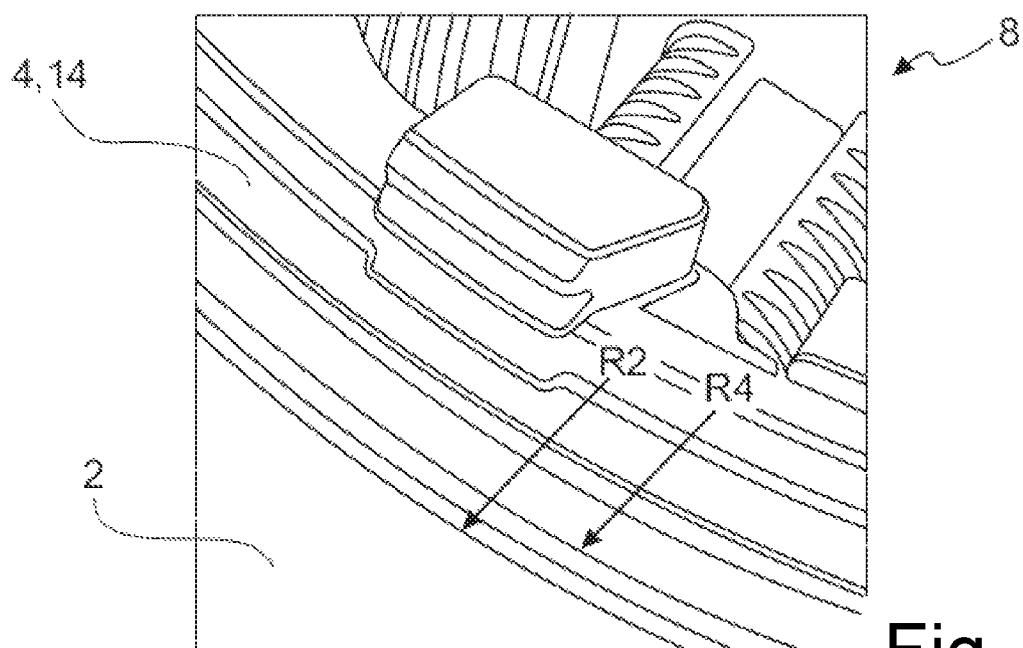
Figure 5B:
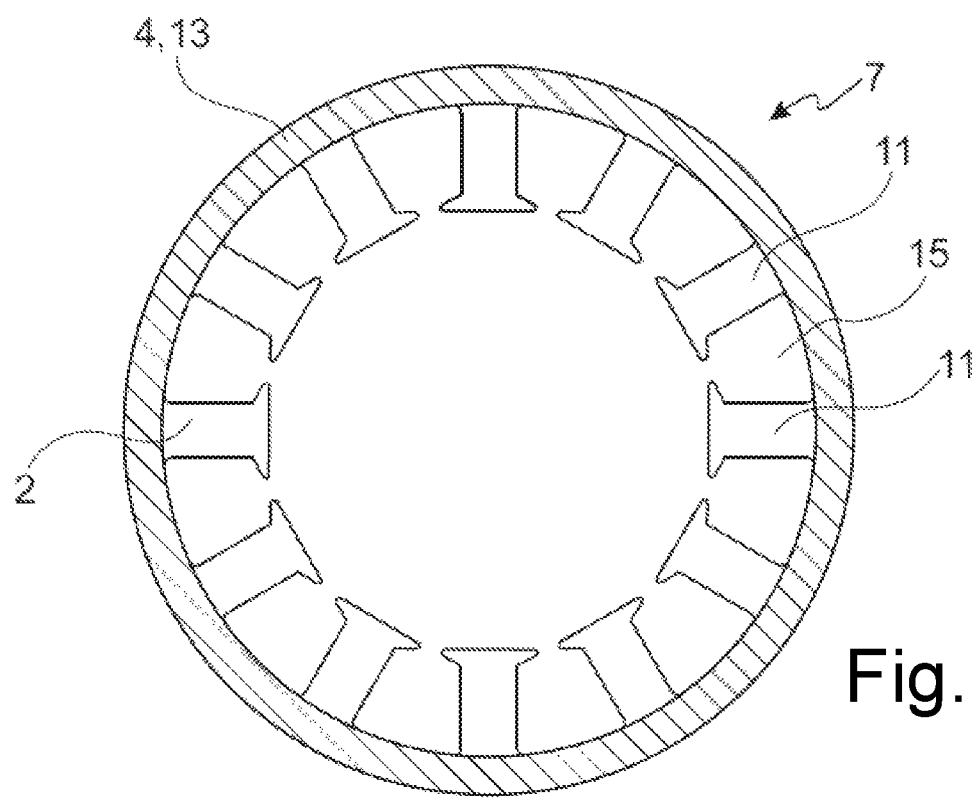

Further details, features, and advantages of embodiments of the invention result from the following description of exemplary embodiments with reference to the corresponding drawings. The following is shown:

FIG. 1: a stator of an electric motor as a device for driving a compressor of a vaporous fluid having a stator core, coils, an insulation element, a support element arranged on a first front side, as well as a cover element arranged on a second front side, in a perspective view;

FIGS. 2A to 2D: the stator with a stator core and an insulation element, in a perspective view; as well as FIG. 3: the insulation element as an individual structure, in a perspective view;

FIGS. 4A to 4C: a detailed view of the stator core with protruding areas of the surface covered by the insulation element;

FIG. 5A: a detailed view of a front side of the stator pointing toward the compression mechanism, with the stator core and insulation element;

FIG. 5B: a top view of a front side of the stator pointing toward the inverter, with the stator core and insulation element; as well as FIGS. 6A to 6D: a detailed view of the stator with stator core and insulation element with guiding contours or a mounting area for mounting conducting wires.

DETAILED DESCRIPTION

FIG. 1 shows a stator 1 of an electric motor as a device for driving a compressor of a vaporous fluid, especially for a climate-control system of a motor vehicle, for conveying coolant through a coolant circuit, in a perspective view. The stator 1 is formed with a stator core 2, coils 3, an insulation element 4, a support element 6, as well as a cover element 10.

The electric motor, for example an alternating current motor with three phases, has a rotor, not shown, and a stator core 2 arranged in the radial direction on an outer side of the rotor and thus about the rotor. The stator core 2, which is preferably formed as a laminated core, and the insulation element 4, which is formed from an electrically insulating material, extend along a longitudinal axis 5, which also corresponds to the longitudinal axis of the stator 1 and the axis of rotation of the rotor, from a first front side 7 to a second front side 8 of the stator 1. The insulation element 4 is advantageously formed as a mold of the stator core 2 and thus as a single-piece component. The first front side 7 of the stator 1 is facing an inverter, when the electric motor is mounted, while the second front side 8 is aligned toward a compression mechanism.

The coils 3 are formed from a wire wound about an area of the stator core 2, which extends inward in the radial direction, as an electric conductor, also characterized as a conducting wire 9. The non-wound ends of the conducting wires 9 are routed out of the respective winding as connecting lines or connection lines. The connection lines are preferably sheathed with an insulating material.

The areas of the stator core 2, which extend inward in the radial direction, have the shape of a bar 11, also characterized as a stator tooth, and are positioned evenly distributed about the circumference of an outer wall of the stator core 2. The insulation element 4, which electrically insulates the respective bar 11 of the stator core 2 and the conducting wires 9 of the coils 3 with respect to one another, is arranged between the conducting wires 9 of the coils 3 and the corresponding bars 11. The insulation element 4 is extended in the axial direction at the ends of the bars 11 aligned inward in the radial direction and outward in the axial direction. The end sections, which protrude thusly, of the insulation element 4 are used to affix the conducting wires 9 of the coils 3, said conducting wires being wound about the bars 11 of the stator core 2.

The stator core 2, the insulation element 4, and the coils 3 form the stator unit of the electric motor.

The insulation element 4 protrudes over the stator core 2 on the front sides 7, 8 of the stator 1. On the first front side 7 of the stator 1, the support element 6 is arranged with a mounting element having connection passages for a connector housing with connections. The connections of the connector housing are used as a component of an electrical connection between the coils 3 of the electric motor and the inverter, for example with the help of electrically conducting, pin-shaped connectors, which are arranged to be routed through the connection passages of the mounting element of the support element 6 and inserted into the connections of the connector housing.

The connection lines of the conducting wires 9 of the coils 3 and the connection lines of the connector housing arranged in the mounting element are electrically connected to one another.

The support element 6 rests against the stator 1, particularly the stator core 2, in the axial direction when the stator 1 is mounted. In doing so, the outer diameter of the support element 6 is less than the outer diameter of the stator core 2. The mounting element for the connector housing is a component of the support element 6, such that the support element 6 and the mounting element are formed as one unit, particularly as a single-part injection-molded element. The single-part formation is implemented within a shaping process.

An annular cover element 10, which rests fully against the stator 1, particularly the insulation element 4, in the axial direction when the stator 1 is mounted, is arranged on the second front side 8, formed distal to the first front side 7, of the stator 1. The cover element 10 is formed as an axially aligned closed ring in the shape of a cylinder, particularly in the shape of a hollow cylinder, especially in the shape of a hollow circular cylinder. The hollow-cylindrical wall of the axially aligned ring of the cover element 10 is formed with an outer diameter, which is less than the outer diameter of the outer wall of the stator core 2, and an inner diameter, which is greater than the inner diameter of the outer wall of the stator core 2.

FIGS. 2A to 2D each show the stator 1 with a stator core 2 and an insulation element 4, in a perspective view. In this case, FIGS. 2B and 2C show views of the first front side 7 of the stator 1, while FIG. 2D shows a view of the second front side 8 of the stator 1.

The insulation element 4, which is formed as an electrically insulating mold of the stator core 2 opposite the conducting wires 9, which are not shown, covers the entire surface of the stator core 2 to be insulated and is form-fitting with an outer shell surface on an inner side of an outer wall of the stator core 2 in the radial direction. Thus, the values of the diameter of the outer shell surface of the insulation element 4 and the inner side of the outer wall of the stator core 2 are identical. Particularly the areas of the stator core 2 which are arranged directly adjacent the conducting wires 9 are insulated upon the formation of the insulation element 4.

As a result of the structure of the insulation element 4, said structure being formed as a mold, an integral, single-piece component made up of the stator core 2 and insulation element 4 is produced as a contiguous unit, which cannot be disassembled without destruction.

The wall of the insulation element 4 protrudes over the stator core 2 in the axial direction, on the front sides 7, 8 of the stator 1. The areas 13, 14 of the insulation element 4, which protrude from the stator core 2, are formed as a substantially hollow-circular-cylinder-shaped wall with molding, wherein the wall is arranged in the axial direction.

The insulation element 4 has passages in the areas of the stator core 2 which are formed as bars 11, are distributed uniformly about the circumference of the outer wall of the stator core 2, and which extend inward in the radial direction. The bars 11 of the stator core 2 are arranged within the passages, said bars protruding from the passages with a front side 11a aligned inward in the radial direction. The front sides 11a, which are aligned in the direction of the rotor, which is not shown, of the bars 11 of the stator core 2 are consequently not covered by the insulation element 4 and thus not electrically insulated.

An intermediate space 15, in the form of a groove or a slot, which is open inward on the front sides 7, 8 of the stator 1 as well as in the radial direction, is between two bars 11, which are adjacent to one another and distributed uniformly on the circumference of the outer wall of the stator core 2 with the insulation element 4 shaped about the bars 11. Because the bars 11 are arranged uniformly distributed over the circumference of the outer wall of the stator core 2 and the areas of the insulation element 4, which are formed about the bars 11, have the same shape with the same dimensions, the intermediate spaces 15 of the insulation element 4 have identical shapes and dimensions.

The bars 11 are formed with the insulation element 4 extensively arranged around the bars 11 with substantially constant cross-sectional surfaces in the radial direction, except for the area of the front sides 11a of the bars 11, such that the intermediate spaces 15 taper inward in the radial direction. In the area of the front sides 11a, the bars 11 additionally have a larger cross-sectional surface than, for example, in the area of the outer wall of the stator core 2. Thus, the intermediate spaces 15 are formed with a minimal expansion in the area between the front sides 11a of the bars 11. In the axial direction, the cross-sectional surfaces of the intermediate spaces 15 are constant.

The magnetically active sections of the conducting wires 9 wound into coils 3, which are also not shown, are arranged about the areas of the insulation element 4 extending inward in the radial direction and about the bars 11, said insulation element then being formed between the stator core 2 and the conducting wire 9 of the coils 3. The end sections of the insulation element 4, which extend in the axial direction as a protrusion 12 or an extension 12 on the ends of the bars 11 aligned inward in the radial direction and outward in the axial direction, are used to affix the conducting wires 9 of the coils 3 wound about the bars 11. In doing so, slipping or loosening of the conducting wires 9 in the radial direction inward is prevented, especially during the process of winding the coils 3. Thus, the conducting wire 9 of a coil 3 is always resting against the insulation element 4 or an adjacent winding belonging to the same coil 3.

The insulation element 4 is formed between the coils 3 and the stator core 2 as well as particularly about the entire inner shape of the stator core 2, with the exception of the front sides 11a of the bars 11. Consequently, the front sides 11a, which are aligned inward in the radial direction and not covered by the insulation element 4, of the bars 11 of the stator core 2 are not electrically connected to the conducting wires 9 of the coils 3.

Depending on the voltage situation, additional insulators can be omitted with the single-part insulation element 4, which is formed as a contiguous mold between the coils 3 and the stator core 2 as well as particularly about the entire inner shape of the stator core 2. The insulation element 4 is advantageously formed as an injection-molded element from a material for electrical insulation and has no separate connecting elements or fixing elements for the stator core 2. The insulation element 4 is directly connected to the stator core 2 in a form-fitting manner by means of injection molding and the structure thereby created and additionally preferably has various elements for fixing and guiding the conducting wires 9, which are formed integrated directly into the structure. After the integral formation of the stator core 2 and insulation element 4, the individual components are inseparably connected to one another. The stator core 2 and the insulation element 4 can only be detached from one another through destruction of at least one of the components. Only one process step is required for producing the entire insulation element 4 about the area of the stator core 2.

The insulating material is applied to the inner surfaces of the stator core 2, which form the intermediate spaces 15, over the entire length of the stator core 2, in an injection-molding process, starting at the front sides 7, 8 of the stator core 2, in the axial direction. The inner surfaces of the stator core 2 form the contact surfaces for the injection-molding process. In doing so, the stator core 2, which is formed as a laminated core, is inserted into an injection-molded tool. The resulting intermediate space between the stator core and the injection-molded tool is filled with electrically insulating casting material. Depending on the position of the stator core, the intermediate space is filled from below upward in the axial direction of the stator core. The injection-molded structure thusly created ensures complete insulation of the conducting wires 9, i.e. the coils 3 and the connecting lines, with respect to the stator core 2.

On the first front side 7, the insulation element 4 additionally has a mounting area 16 in the form of a chamber, which is used to mount connections of conducting wires 9. The mounting area 16 in this case is configured so as to ensure a hermetic seal of the connecting point of the connecting wires 9 by means of casting with a preferably electrically insulating casting compound. For example, a connecting point provided as a motor star point may be arranged within a mounting area 16.

FIG. 3 shows the insulation element 4 as an individual structure and thus without the stator core 2, in a perspective view.

In addition to the walls, which protrude over the stator core 2, which is not shown, on the front sides 7, 8 in the axial direction, of areas 13, 14, the insulation element 4 has passages 17 formed in the areas of the bars 11 of the stator core 2. The bars 11 of the stator core 2 are arranged within the passages 17 in a guided manner, said bars protruding from the passages 17 with a front side 11a aligned inward in the radial direction.

Thus, the insulation element 4 is formed about the entire inner shape of the stator core 2, that is about the inner surface of the outer wall of the stator core 2, also characterized as the inner surface, with the exception of the front sides 11a of the bars 11.

FIGS. 4A to 4C each show a detailed view of the stator core 2 with protruding areas of the inner surface of the stator core 2. The inner surface of the stator core 2 includes, inter alia, the front sides 11a, the side surfaces 11b, and the inner sides 11c of the bars 11. The respectively characterized areas are covered by the insulation element 4.

Thus, FIG. 4A indicates the base surface 15a of an intermediate space 15 formed between the bars 11 of the stator core 2, said intermediate space also characterized as the back side or back wall of a stator groove. The base surfaces 15a of the intermediate spaces 15 are completely covered by the insulation element 4 as sub-areas of the inner surface of the stator core 2, which corresponds to 100% coverage of the base surfaces 15a.

FIG. 4B shows a side surface 11b of the bar 11. In doing so, both side surfaces 11b, as sub-areas of the inner surface of the stator core 2, and which are arranged on both sides of a bar 11 or delimiting an intermediate space 15, are completely covered by the insulation element 4, which corresponds to 100% coverage of the side surfaces 11b.

FIG. 4C shows an inner side 11c of the bar 11, particularly the front side 11a of the bar 11. The two inner sides 11c of a bar 11 correspond substantially to a back side of the front side 11a. While the front side 11a is arranged aligned in the radial direction with respect to the longitudinal axis 5 of the stator 1 and thus with respect to the axis of rotation, the inner sides 11c of the bar 11 each point in the radial direction outward and are aligned in the direction of the base surface 15a of the intermediate space 15. In doing so, at least 50% of the surfaces of the inner sides 11c of the bars 11, as the sub-surfaces delimiting the intermediate spaces 15 and as sub-areas of the inner surface of the stator core 2, are covered by the insulation element 4.

FIG. 5A shows a detailed view of the second front side 8, which is aligned toward the compression mechanism, of the stator 1 with the stator core 2 and the insulation element 4. The outer diameter of the cylindrical wall protruding over the stator core 2 in the axial direction, as a sub-area of the insulation element 4, is greater than the inner diameter of the outer wall of the stator core 2 and merely unsubstantially less than the outer diameter of the outer wall of the stator core 2. In this case, the outer radius R2 of the stator core 2 and the outer radius R4 of the insulation element 4 differ by no more than 1 mm within the second area 14 protruding from the stator core 2.

FIG. 5B shows a top view of the first front side 7, which is aligned toward the inverter, of the stator 1 with the stator core 2 and the insulation element 4. The stator core 2 front surface covered by the cylindrical wall protruding over the stator core 2 in the axial direction, as a sub-area of the insulation element 4, is shown. In this case, at least 60% of the front surface of the stator core 2 is covered, in the area of the first front side 7 of the stator 1, by the first area 13 protruding from the stator core 2. The front surfaces, pointing in the direction of the first front side 7, of the bars for mounting the conducting wires 9 wound into coils 3 are not considered here such that the information only relates to an area of the front surface of the stator core 2, particularly also characterized as the magnetic return yoke.

FIGS. 6A to 6D show detailed views of the stator 1 with the stator core 2 and the insulation element 4 with guiding contours 18, 19 or the mounting area 16 for mounting conducting wires 9.

FIG. 6A particularly shows a detailed view of the bars 11 of the stator core 2, which are arranged extending in the radial direction inward and uniformly distributed about the circumference of the outer wall of the stator core 2, with the insulation element 4 arranged about the bars 11 and on the inner side of the outer wall of the stator core 2.

Consequently, the insulation element 4 is arranged between the conducting wires 9 wound into coils 3, which are not shown, and the respective bar 11 of the stator core 2. The insulation element 4 has first guiding contours 18 on the free surfaces, aligned in the axial direction, of the bar 11, which are formed on an outer side of the insulation element 4 resting against a side surface 11b of a bar 11.

The first guiding contours 18, which are consequently aligned toward the intermediate space 15 formed between adjacent bars 11 and in the axial direction of the stator 1, have the shape of notches arranged parallel to one another. Each first guiding contour 18 formed as a notch is used to mount a partial section of a conducting wire 9 wound into a coil 3, particularly for a first or inner layer of the conducting wire 9 of the coil 3. Thus, the inner layers of the conducting wires 9 are guided on the specified paths during winding of the coils 3.

In addition, the wound conducting wires 9 of the coils 3 are guided on the ends of the bars 11 aligned inward in the radial direction and aligned outward in the axial direction as well as extended in the axial direction.

FIGS. 6B and 6C show particularly a detailed view of the second front side 8, which is aligned toward the compression mechanism, of the stator 1 with the stator core 2 and the insulation element 4. The wall protruding over the stator core 2 in the axial direction, as the second area 14 of the insulation element 4, said area protruding from the stator core 2, has second guide contours 19 for mounting magnetically inactive sections of the conducting wires 9, just as the connection lines and the connecting lines extending between the areas of the conducting wires 9 wound into coils 3.

The second guide contours 19, which are formed as molding and in the circumferential direction of the stator 1, likewise have the shape of notches arranged parallel to one another. Each second guiding contour 19 formed as a notch is used for mounting a partial section of a magnetically inactive conducting wire 9. Thus, the sections of the conducting wires 9 are guided and insulated with respect to one another and with respect to the stator core 2.

As is particularly shown in FIG. 6C, the insulation element 4 is formed for attaching the cover element 10. The cover element 10 is placed and affixed on the second front side 8 of the stator 1, particularly on the second area 14 of the insulation element 4, said area protruding from the stator core 2. In doing so, the cover element 10 is latched or snapped onto the insulation element 4.

With the cover element 10, both the sections of the conducting wires 9, which are insulated with coating and wound into coils 3, particularly in the area of the deflections on the second front side 8 of the stator 1, and the sections, formed between the coils 3, of the non-wound conducting wires 9, which are insulated with coating and guided out of or in to the respective windings, are covered with respect to the environment of the stator 1. In addition, the sections of the conducting wires 9 guided out of the respective windings, and formed as a connection to the connector housing and thus to the inverter, are insulated by a cover element with respect to the environment.

The magnetically inactive sections of the conducting wires 9 are integrated within the second guiding contours 19 on the insulation element 4, which are formed as molding and aligned in the circumferential direction of the stator 1. Thus, the magnetically inactive sections of the conducting wires 9 are arranged so as to be protected between the insulation element 4 and the cover element 10 in the radial direction. The second guiding contours 19 are formed in a plane aligned vertically with respect to the direction of the stator 1.

The cover element 10, which is substantially shaped as a hollow circular cylinder, particularly as a ring, rests with an inner surface of the axially aligned ring against a shell surface of the wall of the second area 14 of the insulation element 4, said area protruding from the stator core 2. In doing so, the outer diameter of the wall of the insulation element 4 corresponds to the diameter of the inner surface of the cover element 10.

The annular cover element 10 is arranged with the inner surface so as to cover the second guiding contours 19 circumferentially in the circumferential direction on the wall of the second area 14 of the insulation element 4, said area protruding from the stator core 2, and said guiding contours being formed as notches or grooves and into which the conducting wires 9 are integrated. Because the cover element 10, just as the insulation element 4, comprises electrically insulating components, the conducting wires 9, which are arranged in second guiding contours 19, which are formed in the insulation element 4 and covered by the cover element 10, are completely enclosed by electrical insulation.

The annular cover element 10 has a latching element 20 formed on the inner surface as a circumferential rib. The latching element 20 in this case is arranged, preferably completely, in a plane vertically aligned with respect to the axial direction of the stator 1. Thus, both the groove-like second guiding contours 19 provided on the insulation element 4 for mounting a conducting wire 9 as well as the latching element 20 arranged on the cover element 10 are arranged in a plane aligned vertically with respect to the axial direction of the stator 1. When the cover element 10 is mounted on the insulation element 4, the latching element 20 and a latching recess 21 formed on the insulation element 4 correspond with one another such that the latching element 20 is arranged so as to latch into the latching recess. Similar to a second guiding contour 19, the latching recess 21 is formed as molding in the circumferential direction of the stator 1 and has the shape of a rib arranged parallel to a second guiding contour 19. Alternatively, the latching element 20 may also correspond with one of the two guiding contours 19 such that the latching element 20 is arranged to latch in one of the second guiding contours 19. The latching element 20 then either engages the latching recess 21 or one of the second guiding contours 19 such that the cover element 10 and the insulation element 4 are durably connected to one another. Upon latching of the latching element 20, also characterized as a fixing element, the cover element 10 is durably connected to the insulation element 4 such that separation of the components is not possible without damaging force.

FIG. 6D shows a detailed view of the first front side 7, aligned toward the inverter, of the stator 1 with the stator core 2 and the insulation element 4 having a mounting area 16 for mounting conducting wires 9, especially connections of conducting wires 9. The mounting area 16 is formed in the shape of a chamber, which is only open on one upper side and has an opening for inserting ends of the conducting wires 9 into the mounting area 16 at least on one narrow side. After connection of the ends of the conducting wires 9 within the chamber, the mounting area 16 can be sealed by means of casting with a preferably electrically insulating casting compound such that the connection point of the conducting wires 9 is hermetically sealed.

According to FIG. 1, the support element 6 is additionally arranged on the first front side 7 of the stator 1, the support element being arranged with a radially aligned circular ring surface on the wall protruding over the stator core 2 in the axial direction as a second area 14 of the insulation element 4, said area protruding from the stator core 2 as well as with an axially aligned cylinder-shaped ring surface on the shell surface of the wall of the insulation element 4. In doing so, the outer diameter of the wall of the insulation element 4 corresponds substantially to the inner diameter of the support element 6 in the area of the axially aligned hollow-cylinder-shaped ring surface, plus clearance and/or a gap for mounting.

LIST OF REFERENCE NUMERALS

1 Stator
2 Stator core
3 Coil
4 Insulation element
5 Longitudinal axis
6 Support element
7 First front side
8 Second front side
9 Conducting wire
10 Cover element
11 Bar
11a Front side, bar 11
11b Side surface, bar 11
11c Inner side, bar 11
12 Extension, protrusion, insulation element 4
13 First protruding area, insulation element 4
14 Second protruding area, insulation element 4
15 Intermediate space
15a Base surface, intermediate space 15
16 Mounting area
17 Passage, insulation element 4
18 First guiding contour
19 Second guiding contour
20 Latching element
21 Latching recess
R2 Outer radius, stator core 2
R4 Outer radius, insulation element 4

What is claimed is:

1. A device for driving a compressor of a vaporous fluid comprising:
    an electric motor having a rotor and a stator, which are arranged extending along a common longitudinal axis; and
    an insulation element, wherein the insulation element is formed as a single piece and connected in a form-fitting manner with a stator core of the stator such that the stator core and the insulation element form an integral and single-piece component of the stator, wherein the stator core and the insulation element are formed and arranged extending along the longitudinal axis from a first front side to a second front side of the stator, a support element arranged on the first front side of the stator and a cover element arranged on the second front side of the stator, and wherein the insulation element is formed with a first guiding contour and a second guiding contour, wherein a first area of the insulation element protrudes from the stator core in an axial direction thereof at the first front side of the stator, wherein the first area of the insulation element is formed as a substantially cylinder-shaped wall having a mounting area formed in a shape of a chamber for mounting connections of conducting wires as well as a casting compound for sealing off a connection point of the conducting wires, wherein the mounting area has an opening in the circumferential direction of the stator for inserting ends of the conducting wires into the mounting area, and wherein the mounting area is disposed along an outer surface of the substantially cylinder-shaped wall with the chamber disposed radially outwardly of the cylindrical-shaped wall with respect to a radial direction of the stator.

2. The device according to claim 1, wherein the insulation element is formed as a mold of the stator core resting against an inner surface of an outer wall of the stator core.

3. The device according to claim 1, wherein the first area of the insulation element protruding from the stator core is formed so as to cover at least 60% of a front surface of the stator core at the first front side of the stator.

4. The device according to claim 1, wherein a second area of the insulation element protruding from the stator core at the second front side of the stator has an outer diameter which is greater than an inner diameter of an outer wall of the stator core.

5. The device according to claim 1, wherein an outer radius of the stator core is no more than 1 mm greater than an outer radius of a second area of the insulation element protruding from the stator core at the second front side of the stator.

6. The device according to claim 1, wherein the stator core is formed with bars for mounting the conducting wires wound into coils.

7. The device according to claim 6, wherein the bars are arranged uniformly distributed about a circumference of an inner side of an outer wall of the stator core.

8. The device according to claim 6, wherein the insulation element is arranged between the conducting wires of the coils and the stator core with the bars.

9. The device according to claim 8, wherein the first guiding contour is formed at least on surfaces of each of the bars and the second guiding contour is formed on a second area of the insulation element protruding from the stator core at the second front side of the stator, the surfaces being aligned in an axial direction of the stator.

10. The device according to claim 6, wherein the insulation element is formed extending in an axial direction of the stator on ends of the bars, which are aligned inward in the radial direction of the stator and outward in the axial direction of the stator.

11. The device according to claim 10, wherein the bars of the stator core are formed protruding from the insulation element with a front side aligned inward in the radial direction of the stator.

12. The device according to claim 11, wherein an intermediate space is formed between every two of the bars, which are arranged adjacent to one another with the insulation element shaped about the bars.

13. The device according to claim 12, wherein each of the intermediate spaces is formed delimited by a base surface, two side surfaces, and two inner sides.

14. The device according to claim 13, wherein the intermediate space is open in the axial direction of the stator as well as the radial direction of the stator.

15. The device according to claim 14, wherein the base surface of the intermediate space is completely covered by the insulation element.

16. The device according to claim 15, wherein the side surfaces of the intermediate space are completely covered by the insulation element.

17. The device according to claim 16, wherein surfaces of the inner sides of the intermediate space are covered at least 50% by the insulation element.

18. The device according to claim 1, wherein the stator core is formed with bars for mounting the conducting wires wound into coils, and wherein the first guiding contour is formed at least on surfaces of each of the bars and the second guiding contour is formed at least on one outer side of a wall of a second area protruding from the stator core at the second front side of the stator, the wall protruding over the stator core on the second front side of the stator in the axial direction.

19. The device according to claim 1, wherein the cover element has the shape of an axially aligned hollow circular cylinder.

20. The device according to claim 19, wherein the cover element rests completely against an outer side of a wall of a second area of the insulation element protruding from the stator core at the second front side of the stator, wherein a diameter of an inner surface of the cover element corresponds to a diameter of the wall of the second area of the insulation element.

21. The device according to claim 1, wherein the cover element and the insulation element are formed to be connectable with one another in a form-fitting manner.

22. A method for producing the stator of the device for driving the compressor of the vaporous fluid according to claim 1, wherein an insulating material is applied, in an injection-molding process, to intermediate spaces and contact surfaces for inner surfaces of an outer wall of the stator core, the inner surfaces extending from the first front side to the second front side in an axial direction of the stator and the inner surfaces being formed for the injection-molding process.

23. The method according to claim 22, wherein the insulation element is formed so as to protrude over the stator core at the second front side of the stator.

24. The device according to claim 1, wherein at least a portion of the mounting area is disposed radially outwardly of an inner surface of an outer wall of the stator core with respect to the radial direction of the stator.

* * * * *